United States Patent [19]

Lee et al.

[11] 4,456,742

[45] Jun. 26, 1984

[54] POLYURETHANE COATING COMPOSITION WITH A CURATIVE CONTAINING POLYHYDROXYALKYLPHOSPHINE OXIDE

[75] Inventors: Fui-Tseng H. Lee, Princeton; Joseph Green, East Brunswick, both of N.J.

[73] Assignee: FMC Corporation, Philadelphia, Pa.

[21] Appl. No.: 476,162

[22] Filed: Mar. 17, 1983

[51] Int. Cl.³ .............................................. C08G 18/80
[52] U.S. Cl. ...................................................... 528/45
[58] Field of Search ........................................... 528/45

[56] References Cited

U.S. PATENT DOCUMENTS

| | | | |
|---|---|---|---|
| 3,445,405 | 5/1969 | Vogt | 260/2.5 |
| 3,513,113 | 5/1970 | Praetzel et al. | 260/2.5 |
| 3,925,265 | 12/1975 | Lin | 260/2.5 AJ |
| 4,343,914 | 8/1982 | Lee | 521/168 |

Primary Examiner—Maurice J. Welsh
Attorney, Agent, or Firm—Robert D. Jackson; Eugene G. Horsky; Eugene G. Seems

[57] ABSTRACT

A heat curable polyurethane composition comprising a blocked NCO prepolymer and a hydroxyl curative containing a polyhydroxyalkylphosphine oxide.

10 Claims, No Drawings

POLYURETHANE COATING COMPOSITION WITH A CURATIVE CONTAINING POLYHYDROXYALKYLPHOSPHINE OXIDE

This invention relates to polyurethanes, particularly to improved polyurethane coating compositions and their preparation.

Polyurethanes comprise a well-known class of polymers, the characteristic structural unit of which is the urethane linkage, $$-\underset{H}{N}-C(O)O-.$$

By varying the reaction conditions and/or using structural derivatives of the basic reactants, it is possible to provide urethane polymers from which a wide variety of plastic articles and materials can be manufactured. For instance, one valuable and important use of polyurethanes is in the manufacture of coatings. Although numerous formulations have been developed over the years, polyurethane coatings normally fall within the five general types which have been classified by the American Society for Testing Materials (ASTM). Except for ASTM Type I, all are derived by curing a reactive precursor material in the form of an NCO terminated prepolymer. The latter is formed by condensing an excess of a polyisocyanate with an organic polyol, commonly a polyester or polyether having free hydroxy groups; curing of the NCO terminated prepolymer is effected by reacting it with a hydrogen donor, for example, moisture, polyhydroxy compound or amine to give the final polymer product. ASTM Type II is a one-package moisture curable urethane prepolymer having a free NCO content of around 3 to 4%, at a non-volatile level of about 40 to 50%. The remaining isocyanate reacts with atmospheric moisture after it has been applied to give a film containing a large percentage of urea groups. ASTM Type III is a prepolymer having a high level of NCO which is tied up with a phenol to prevent subsequent reaction at ambient temperature. This type of material is known as a blocked urethane and is extensively used in coatings which are baked after application. The phenol splits off at temperatures in excess of about 350° F., after which curing of the coating proceeds very rapidly owing to the vigorous reaction between the available NCO and the hydrogen donor which could not occur as long as the NCO was combined with the phenolic blocking agent. ASTM Type IV is a two-package urethane, one of which contains the NCO prepolymer, the other of which contains a highly reactive diamine plus other ingredients to promote flow, bubble release and other minor components. ASTM Type V is also a two-package formulation where the first component is the NCO prepolymer and the second component is a polyol.

Of the ASTM classified urethane, Type III is emerging as the most important in the coating field. It is a single-package, prepolymer system which provides many of the advantages of two-component urethanes while devoid of the mixing and proportioning problems associated with two-component materials. Blocked urethanes are moisture insensitive, stable over long periods, and generally easy to transport, use and handle, requiring only that they be protected from undue heat.

Although coatings must exhibit various chemical and physical properties, for example, resistance to marring, cracking, solvent attack, moisture penetration, discoloration, corrosion, U.V. breakdown; strength and hardness are also important. However, good adhesion to a substrate is perhaps the most fundamental requisite.

It has now been discovered that the enumerated desiderate aforesaid can be realized to a marked degree from heat curable NCO prepolymer/hydroxy curative composition in which at least part of the hydroxy curative is a polyhydroxyalkylphosphine oxide and the provision of said heat curable composition and the heat cured polyurethane coating produced therefrom constitutes the principal object and purpose of the invention. Other objects and purposes will become manifest subsequently.

In carrying out the invention, polyurethane coatings are preferably produced in the known manner of using and formulating ASTM Type III urethanes by applying to a substrate a mixture of a blocked NCO prepolymer and a hydroxy curative containing a trishydroxyalkylphosphine oxide, and the so-treated substrate baked to drive off the blocking agent and promote curing. In the case of phenolic blocked urethane prepolymer, baking is usually effected at temperatures around 350° C.

Blocked urethanes are well-known chemical entities, the description and preparation of which are extensively documented in the patent and technical literature. Generally, an NCO prepolymer is first prepared by reacting excess diisocyanate with a hydrogen donor, for example, polyether or polyester polyol, until maximum reaction is reached as indicated by the desired available NCO percentage after which the blocking agent is introduced to completely block the remaining NCO. To insure complete stability, most formulations include 1 2% excess blocking agents. To the blocked prepolymer is then added the equivalent amount of hydrogen donor, for example, amine or polyhydroxy compound to give the heat curable, blocked NCO prepolymer composition. For further details on blocked urethanes and their use in coating formulations, reference is made to the well-known treatise, "The Development and Use of Polyurethane Products" by E. N. Doyle published by MCGraw-Hill, Inc. (1971).

The polyhydroxyalkylphosphine oxides used in the practice of the invention can be represented by the following formula:

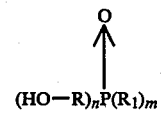

wherein R is alkylene of 3 to 6 carbon atoms, $R_1$ is an alkyl of 2 to 10 carbon atoms, cycloalkyl of 6 to 12 caron atoms, n is an integer of 2 or 3. it being understood that the n is 2 and m is 1 and when n is 3, m is 0. Exemplary phosphine oxides include the following:

$$(HOCH_2CH_2CH_2)_3PO$$

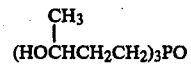

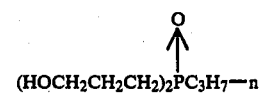

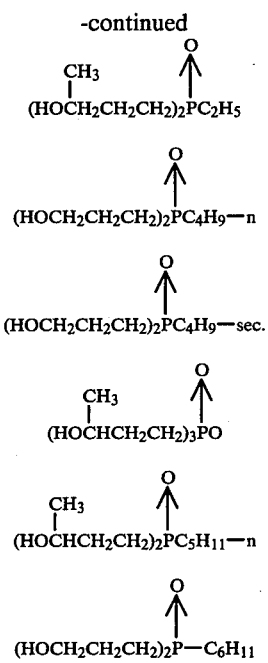

Polyhydroxyalkylphosphine oxides belong to a known class of chemical compounds which are described in the technical literature. They may be prepared by first forming the intermediate phosphine by reacting an excess of an olefinic compound with a phosphine compound in the presence of a free radical catalyst. The phosphine adduct is then contacted with an oxidizing agent such as hydrogen peroxide to give the phosphine oxide. Generally speaking, polyhydroxyalkylphosphine oxides are low melting solids which are hydrolytically stable.

Urethane based coatings may be employed using conventional plant procedures such as dipping, electrostatic spray, corona electric spray, airless spray, flow or curtain coating and other known techniques.

Reference is now made to the following procedures and non-limiting examples.

EXAMPLE COMPONENTS

| Identification | Chemical Composition | Mol. Wt. | Eq. Wt. | Supplier |
|---|---|---|---|---|
| Hydroxyl Components | | | | |
| THPPO | Tris(3-hydroxypropyl)phosphine oxide | 224.0 | 74.66 | FMC Corp. |
| Desmophen 650 | Hydroxy terminated polyester resin | | 215.00 | Mobay Chem. |
| Crelan U-502 | Hydroxy terminated polyester resin | | 1133.30 | Mobay Chem. |
| Epoxy Resin Epon 1001 | Epoxy-hydroxy terminated resin | 1000.0 | 500.00 | Shell |
| Trimethylol propane | Trifunctional hydroxyl compound | 134.0 | 44.60 | |
| Isocyanate Components | | | | |
| Crelan Hardener U-T m.temp. 60° C. | Blocked aromatic diisocyanate adduct | 672.0 | 336.0 | Mobay Chem. |
| Crelan Hardener U-I | Blocked aliphatic diisocyanate adduct | 730.4 | 365.2 | Mobay Chem. |
| Other Components | | | | |
| Catalyst T-12 (DBTDL) | Dibutyltin dilaurate | | | M & T Chem. Inc. |
| Modaflow-flow agent | | | | Monsanto |
| Silicone fluid L-522-flow agent | | | | Union Carbide |
| MEK Solvent | Methylethylketone | | | |

The examples of the invention and the prior art were formulated using one of the following mixing procedures.

Mixing Procedures

A. Dibutyltin dilaurate (DBTDL) catalyst is dissolved in methylethylketone (MEK) and the solution sprayed over a pulverized blend of the NCO and OH components. The solvent is removed after which the solidified residue is ground in a ball mill for 24 hours. A solids fraction passing through a 150 mesh sieve was collected and the powder sprayed on grounded metal panels with an electrostatic spray gun and the resulting layer baked at 200° C.

B. The OH components, DBTDL catalyst and flow agent are mixed and melted to give a homogeneous blend. After solidifying, the blend is crushed and mixed with the NCO component. The solids are transferred to a ball mill and ground for 24 hours. A fraction passing a 150 mesh sieve was sprayed with an electrostatic spray gun on grounded metal panels which were baked at 200° C.

C. The catalyst (DBTDL), flow agent, pulverized NCO and OH components are melted together at 90° C. and mixed until a homogeneous blend is obtained. On cooling to room temperature, the solidified mass is crushed and ground in a ball mill for 48 hours. A portion passing through a 150 mesh sieve is collected. This fraction is sprayed on grounded metal panels with an electrostatic spray gun and baked at 200° C.

D. Dibutyltin dilaurate (DBTDL) catalyst, OH and NCO components and modaflow-flow agent are mixed at room temperature in a blender for 2 minutes. The solids are then crushed and ground in a glass bowl by hand for 10 to 20 minutes. The ground powders are sifted through a 150 mesh sieve and the sifted portion sprayed on grounded metal panels with an electrostatic spray gun and the resulting coating baked at 200° C.

COATING TEST PROCEDURES

1. Appearance of powder is observed visually determining smoothness of flow, orange peel on the surface, etc.

2. Mar-proofness is determined by just scraping under pressure with a reverse nail over the surface of the film. If no residual scraping mark was left, the film is considered to be mar-proof.

3. Discoloration after baking is determined visually.

4. Solvent Resistance, ASTM D 2792-60. Small cotton balls are placed on the coated panel and were soaked with a solvent. The films are checked every hour for softening, swelling, blistering and solubility.

5. Impact Strength. Impact test is run on Bonderite 37 steel panels according to ASTM D 2794-69. A Gardner impact test is used containing a 4 lb. steel rod, ½" diameter male punch and 9/16" diameter die.

6. Sward Hardness. The Sward hardness is measured with a Sward rocker on glass panels, according to ASTM D 1684.

EXAMPLE 1*

|  | Equivalents of NCO or OH | Parts by Weight | Equiv. % in OH Comp. |
|---|---|---|---|
| NCO Component | | | |
| Aromatic blocked diisocyanate, Crelan Hardener U-T | 1.05 | 100.0 | |
| Hydroxyl Component | | | |
| THPPO | 0.64 | 14.0 | 64.0 |
| Desmophen 650 | 0.23 | 14.0 | 23.0 |
| Epoxy Resin 1001 | 0.13 | 21.5 | 13.0 |
| | | | 100.0 |
| Other Additives | | | |
| T-12, catalyst DBTDL | | 00.7 | |
| Modaflow-flow agent | | 2.0 | |
| MEK | | 40.0 | |
| Curing Conditions | | | |
| Baking Temp. & Time: 200° C., 6 min. | | | |
| Testing Results | | | |
| 1. Appearance of Film: | | | |
| a. Flow: good | | | |
| b. Mar-proofness: good | | | |
| 2. Discoloration After Baking: yellowing | | | |
| 3. Solvent Resistance: | | | |
| a. Toluene: no effect | | | |
| b. Isopropanol: no effect | | | |
| 4. Impact Strength (lbs. in.): | | | |
| a. Direct: 46 | | | |
| b. Reverse: 26 | | | |
| 5. Sward Hardness: 44 | | | |

*Mixing procedure A was followed

EXAMPLE 2*

|  | Equivalents of NCO or OH | Parts by Weight | Equiv. % in OH Component |
|---|---|---|---|
| NCO Component | | | |
| Aliphatic blocked diisocyanate, Crelan Hardener U-I | 1.05 | 100.00 | |
| Hydroxyl Components | | | |
| THPPO | 0.64 | 12.83 | 64.0 |
| Desmophen 650 | 0.23 | 12.83 | 23.0 |
| Epoxy Resin 1001 | 0.13 | 17.12 | 13.0 |
| | | | 100.0 |
| Other Additives | | | |
| T-12, catalyst DBTDL | | 0.75 | |
| Modaflow-flow agent | | 2.00 | |
| MEK | | 40.00 | |
| Curing Conditions | | | |
| Baking Temp. & Time: 200° C., 10 min. | | | |
| Testing Results | | | |
| 1. Appearance of Film: | | | |
| a. Flow: good | | | |
| b. Mar-proofness: good | | | |
| 2. Discoloration After Baking: Does not discolor | | | |
| 3. Solvent Resistance: | | | |
| a. Toluene: no effect | | | |
| b. Isopropanol: no effect | | | |
| c. Ethyl Acetate: no effect | | | |
| 4. Impact Strength (lbs. in.): | | | |
| a. Direct: 76 | | | |
| b. Reverse: 46 | | | |

|  | Equivalents of NCO or OH | Parts by Weight | Equiv. % in OH Component |
|---|---|---|---|
| 5. Sward Hardness: 42 | | | |

*Mixing procedure A was followed

EXAMPLE 3*

|  | Equivalents of NCO or OH | Parts by Weight | Equiv. % in OH Component |
|---|---|---|---|
| NCO Component | | | |
| Aliphatic blocked diisocyanate, Crelan Hardener U-I | 1.05 | 100.0 | |
| Hydroxyl Component | | | |
| THPPO | 0.70 | 14.0 | 70.0 |
| Desmophen 650 | 0.25 | 14.0 | 25.0 |
| Epoxy Resin 1001 | 0.05 | 7.0 | 5.0 |
| | | | 100.0 |
| Other Additives | | | |
| T-12, catalyst DBTDL | | 0.5 | |
| Modaflow-flow agent | | 1.50 | |
| Curing Conditions | | | |
| Baking Temp. & Time: 200° C., 15 min. | | | |
| Testing Results | | | |
| 1. Appearance of Film: | | | |
| a. Flow: good | | | |
| b. Mar-proofness: good | | | |
| 2. Discoloration After Baking: Does not discolor | | | |
| 3. Solvent Resistance: | | | |
| a. Toluene: no effect | | | |
| b. Isopropanol: no effect | | | |
| c. Ethyl Acetate: no effect | | | |
| 4. Impact Strength (lbs. in.): | | | |
| a. Direct: 60 | | | |
| b. Reverse: 30 | | | |
| 5. Sward Hardness: 50 | | | |

*Mixing Procedure B was followed

EXAMPLE 4*

|  | Equivalent of NCO or OH | Part by Weight | Equiv. % in OH Comp. |
|---|---|---|---|
| NCO Component | | | |
| Aliphatic blocked diisocyanate, Crelan Hardener U-I | 1.050 | 100.00 | |
| Hydroxyl Component | | | |
| THPPO | .775 | 17.03 | 77.5 |
| Desmophen 650 | .175 | 10.22 | 17.5 |
| Epoxy Resin 1001 | .050 | 6.81 | 5.0 |
| | | | 100.0 |
| Other Additives | | | |
| T-12, catalyst | | 0.50 | |
| Modaflow-flow agent | | 2.00 | |
| Curing Conditions | | | |
| Baking Temp. & Time: 200° C., 10 min. | | | |
| Testing Results | | | |
| 1. Appearance of Film: | | | |
| a. Flow: good | | | |
| b. Mar-proofness: good | | | |
| 2. Solvent Resistance: | | | |
| a. Toluene: no effect | | | |
| b. Isopropanol: no effect | | | |
| c. Ethyl Acetate: no effect | | | |
| 3. Impact Strength (lbs. in.): | | | |
| a. Direct: 100 | | | |

|  | Equivalent of NCO or OH | Part by Weight | Equiv. % in OH Comp. |
|---|---|---|---|
| b. Reverse: 80 | | | |
| 4. Sward Hardness: 64 | | | |

*Mixing procedure C was followed

In following Examples 5–7 and prior art formulations (a) and (b) mixing procedure (D) was used.

EXAMPLE 5

|  | Equivalent of NCO or OH | Parts by Weight |
|---|---|---|
| NCO Component | | |
| Aliphatic blocked diisocyanate, Crelan Hardener, U-I | 1.05 | 25.56 |
| Hydroxyl Component | | |
| THPPO | 0.50 | 2.56 |
| Crelan U-502 | 0.40 | 30.42 |
| Epoxy Resin 1001 | 0.10 | 3.33 |
| Other Additives | | |
| T-12, catalyst DBTDL | | 0.15 |
| Modaflow-flow agent | | 0.28 (0.8%) |

Curing Conditions
Baking Temp. and Time: 200° C., 10 min.
Testing Results
1. Appearance of Film:
 a. Flow: good
 b. Mar-proofness: good
2. Discoloration After Baking: Does not discolor
3. Impact Strength (lbs. in.):
 a. Direct: 160
 b. Reverse: 160
4. Sward Hardness: 36
5. Solvent Resistance:

| Solvent | Time (Hr.) 1 | 2 | 3 | 4 | 5 | 6 | 7 |
|---|---|---|---|---|---|---|---|
| Toluene | Soft | Soft | Soft | Soft | Soft | Soft | Soft |
| Isopropanol | No Effect | No | No | No | No | No | Soft |
| Ethyl Acetate | Soft | Blistering | | | | | |

EXAMPLE 6

|  | Equivalent of NCO or OH | Parts by Weight |
|---|---|---|
| NCO Component | | |
| Aliphatic blocked diisocyanate Crelan Hardener, U-I | 1.05 | 50.00 |
| Hydroxyl Component | | |
| THPPO | 0.7500 | 7.81 |
| Crelan U-502 | 0.1875 | 27.70 |
| Epoxy Resin 1001 | 0.0625 | 4.07 |
| Other Additives | | |
| T-12, catalyst DBTDL | | 0.375 |
| Modaflow-flow agent | | 1.000 (2.5%) |

Curing Conditions
Baking Temp. and Time: 200° C., 10 min.
Testing Results
1. Appearance of Film:
 a. Flow: good
 b. Mar-proofness: good
2. Discoloration After Baking: Does not discolor
3. Impact Strength (lbs. in.):
 a. Direct: 120
 b. Reverse: 50
4. Sward Hardness: 38
5. Solvent Resistance:

| Solvent | Time (Hr.) 1 | 2 | 3 | 4 | 5 | 6 | 7 |
|---|---|---|---|---|---|---|---|
| Toluene | No Effect | No | Soft | S | S | S | S |
| Isopropanol | No | No | No | No | No | No | No |
| Ethyl Acetate | Soft | Blistering | | | | | |

EXAMPLE 7

|  | Equivalents of NCO Or OH | Parts by Weight |
|---|---|---|
| NCO Components | | |
| Aliphatic blocked diisocyanate, Crelan Hardener, U-I | 1.05 | 30.00 |
| Hydroxyl Component | | |
| THPPO | 1.00 | 5.01 |
| Other Additives | | |
| T-12, catalyst DBTDL | | 0.225 |
| Modaflow-flow agent | | 0.60 (10.0%) |

Curing Conditions
Baking Temp. and Time: 200° C., 10 min.
Testing Results
1. Appearance of Film:
 a. Flow: good
 b. Mar-proofness: good
2. Discoloration After Baking: Does not discolor
3. Impact Strength (lbs. in.):
 a. Direct: 50
 b. Reverse: 15
4. Sward Hardness: 36
5. Solvent Resistance:

| Solvent | Time (Hr.) 1 | 2 | 3 | 4 | 5 | 6 | 7 |
|---|---|---|---|---|---|---|---|
| Toluene | No | No | No | Soft | S | S | S |
| Isopropanol | No | No | No | Soft | S | S | S |
| Ethyl Acetate | Soft | S | S | S | S | S | S |

Prior Art (a)

|  | Equivalent of NCO or OH | Parts by Weight |
|---|---|---|
| NCO Component | | |
| Aliphatic blocked diisocyanate, Crelan Hardener, U-I | 1.05 | 20.00 |
| Hydroxyl Component | | |
| Crelan U-502 | 0.80 | 47.28 |
| Epoxy Resin 1001 | 0.20 | 5.22 |
| Other Additives | | |
| T-12, catalyst DBTDL | | 0.15 |
| Modaflow-flow agent | | 0.40 (0.8%) |

Curing Conditions
Baking Temp. and Time: 200° C., 12 min.
Testing Results:
1. Appearance of Film:
 a. Flow: good
 b. Mar-proofness: good
2. Discoloration After Baking: Does not discolor
3. Impact Strength (lbs. in.):
 a. Direct: 160
 b. Reverse: 160
4. Sward Hardness: 38
5. Solvent Resistance:

| Solvent | Time (Hr.) 1 | 2 | 3 | 4 | 5 | 6 | 7 |
|---|---|---|---|---|---|---|---|
| Toluene | No Effect | Soft | Soft | S | S | S | S |

| -continued | | |
|---|---|---|
| | Equivalents of NCO or OH | Parts by Weight |
| NCO Components | | |
| Aliphatic blocked diisocyanate, Crelan Hardener, U-I | 1.05 | 50.000 |
| Hydroxyl Component | | |
| Trimethylolpropane, TMP | 0.80 | 4.653 |
| Crelan, U-502 | 0.20 | 29.554 |
| Other Additives | | |
| T-12, catalyst DBTDL | | 0.375 |
| Modaflow-flow agent | | 0.630 (1.8%) |
| Curing Conditions | | |
| Baking Temp. and Time: 200° C., 12 min. | | |
| Testing Results | | |
| 1. Appearance of Film: | | |
| a. Flow: good | | |
| b. Mar-proofness: good | | |
| 2. Discoloration After Baking: Does not discolor | | |
| 3. Impact Strength (lbs. in.): | | |
| a. Direct: 80 | | |
| b. Reverse: 50 | | |
| 4. Sward Hardness: 38 | | |
| 5. Solvent Resistance: | | |

| Solvent | Time (Hr.) 1 | 2 | 3 |
|---|---|---|---|
| Toluene | Soft | Dissolving | D |
| Isopropanol | Soft | Dissolving | D |
| Ethyl Acetate | Soft | Dissolving | D |

What is claimed is:

1. A heat curable polyurethane coating composition comprising a blocked urethane NCO prepolymer and a hydroxy curative at least part of which is a polyhydroxyalkylphosphine oxide of the formula:

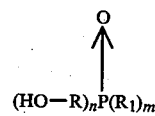

$$(HO-R)_nP(R_1)_m$$

wherein R is alkylene of 3 to 6 carbon atoms, $R_1$ is an alkyl of 2 to 10 carbon atoms, cycloalkyl of 6 to 12 carbon atoms, n is an integer of 2 or 3 it being understood that when n is 2, m is 1 and when n is 3, m is 0.

2. The composition of claim 1 wherein a portion of the hydroxyl curative is a polyhydroxyalkylphosphine oxide.

3. The composition of claim 2 wherein the polyhydroxyalkylphosphine oxide is tris(3-hydroxypropyl) phosphine oxide.

4. The composition of claim 1 wherein the sole hydroxyl curative is a polyhydroxyalkylphosphine oxide.

5. The composition of claim 4 wherein the polyhydroxyalkylphosphine oxide is tris(3-hydroxypropyl) phosphine oxide.

6. A coating produced by heat curing the coating composition of claim 1.

7. A coating produced by heat curing the coating composition of claim 2.

8. A coating produced by heat curing the coating composition of claim 3.

9. A coating produced by heat curing the coating composition of claim 4.

10. A coating produced by heat curing the coating composition of claim 5.

* * * * *